(12) United States Patent
Nemire

(10) Patent No.: US 10,000,405 B2
(45) Date of Patent: Jun. 19, 2018

(54) STELVIN/CORK GLASS WINE BOTTLES

(75) Inventor: Jerald D. Nemire, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1109 days.

(21) Appl. No.: 12/825,950

(22) Filed: Jun. 29, 2010

(65) Prior Publication Data

US 2011/0315651 A1    Dec. 29, 2011

(51) Int. Cl.
*C03B 9/32* (2006.01)
*C03B 9/325* (2006.01)
*B65D 1/02* (2006.01)

(52) U.S. Cl.
CPC .............. *C03B 9/325* (2013.01); *B65D 1/023* (2013.01); *B65D 1/0246* (2013.01)

(58) Field of Classification Search
CPC ......... C03B 9/325; C03B 9/342; B65D 1/023; B65D 1/0246
USPC ........................................................... 65/64
See application file for complete search history.

(56) References Cited

U.S. PATENT DOCUMENTS

| | | | |
|---|---|---|---|
| 530,217 A | 12/1894 | Wolf | |
| 2,588,421 A | 3/1952 | Shepard | |
| 3,994,709 A | 11/1976 | Venti | |
| 4,039,097 A | 8/1977 | Venti | |
| 4,273,567 A * | 6/1981 | Scholl et al. | 65/72 |
| 4,273,569 A * | 6/1981 | Staley | 65/360 |
| 4,362,544 A | 12/1982 | Mallory | |
| 4,427,431 A | 1/1984 | Mumford et al. | |
| 5,407,457 A | 4/1995 | Barbier et al. | |
| 5,589,204 A | 12/1996 | Wohlgemuth | |
| 5,687,862 A | 11/1997 | Barbier et al. | |
| 5,776,518 A | 7/1998 | Wohlgemuth | |
| 5,893,942 A * | 4/1999 | Nickey et al. | 65/171 |
| 6,966,764 B2 | 11/2005 | Wohlgemuth | |
| 2003/0167799 A1* | 9/2003 | Tijerina-Ramos et al. | 65/68 |
| 2004/0031770 A1 | 2/2004 | Gardner et al. | |
| 2004/0079117 A1* | 4/2004 | Kozora | 65/362 |
| 2009/0084799 A1 | 4/2009 | Mondon | |
| 2009/0249835 A1 | 10/2009 | Flynn et al. | |
| 2011/0315651 A1 | 12/2011 | Nemire | |

FOREIGN PATENT DOCUMENTS

| | | |
|---|---|---|
| CN | 2144624 | 10/1993 |
| CN | 2211424 | 11/1995 |
| CN | 101284583 | 10/2008 |
| EP | 0952443 | 10/1999 |
| FR | 1200508 | 12/1959 |
| FR | 2747105 | 10/1997 |
| WO | 2012005920 | 1/2012 |

OTHER PUBLICATIONS

International Search Report; No. PCT/US2011/040698 dated Sep. 23, 2011; 11 pages.

* cited by examiner

*Primary Examiner* — Cynthia Szewczyk

(57) ABSTRACT

A method of molding a wine bottle adapted for use with one but not both of a cork-type plug closure or a Stelvin-type threaded closure includes forming a glass parison having a temporary body and a completed neck finish contoured for receiving either a cork-type plug closure or a Stelvin-type threaded closure. The glass parison is transferred to a mold stage, and the temporary body of the parison is blow molded at the mold stage to form a glass container having a neck coupled to the neck finish. With both neck finish geometries, the neck adjacent to the neck finish has external (L and K) dimensions adapted to receive a Stelvin-type threaded closure and a cylindrical interior adapted to receive a cork-type plug closure.

5 Claims, 2 Drawing Sheets

STELVIN/CORK GLASS WINE BOTTLES

The present disclosure relates to molding glass wine bottles, and more particularly to molding glass bottles for Stelvin-type threaded closures or cork-type plug closures having the same bottle body but differing neck finishes for receiving the respective closures.

BACKGROUND AND SUMMARY OF THE DISCLOSURE

Glass bottles, including glass wine bottles, conventionally are molded in a two-stage operation in which a parison is molded from a hot glass gob at a blank or parison stage, and the container body is then molded from the parison at a mold or blow stage. The container neck finish is formed to final configuration at the blank stage, and the container body and neck are reformed at the mold stage. The two-stage manufacturing operation typically is either a press-and-blow operation in which the parison is formed by pressing the gob in the blank mold using a pressing plunger, or a blow-and-blow-operation in which the glass gob is blown to the configuration of the blank mold. The parison with completed neck finish it is transferred to the blow mold for final blowing, in which the intermediate or temporary body of the parison is blown into the final neck and body of the bottle. U.S. Pat. No. 4,362,544 includes a background discussion of the art of both press-and-blow and blow-and-blow glassware forming processes, and also discusses an electropneumatic forming machine adapted for use in either process. The disclosure of such patent is incorporated herein by reference.

Glass wine bottles typically are manufactured to receive either a cork-type plug closure or a Stelvin-type threaded closure. A Stelvin-type threaded closure typically has a metal shell with internal threads and a long skirt that can be tightly crimped to the container neck to simulate the foil that covers a cork. Change-over of a conventional glassware manufacturing machine from manufacturing bottles having one type of neck finish to manufacturing bottles having the other type of neck finish conventionally is a laborious process requiring change of both the neck rings at the blank stage for molding the neck finishes and the molds at the blow stage for molding the container bodies and necks. A general object of the present disclosure is to provide a method of molding glass wine bottles, and glass wine bottles made by such method, that simplify the process of change-over between Stelvin-type and cork-type wine bottles.

The present disclosure embodies a number of aspects that can be implemented separately from or in combination with each other.

The concept of the present disclosure, simply stated, is to provide a blow mold at the mold stage suitable for forming bottles having a neck (and body) configuration adapted for either Stelvin-type threaded closures or cork-type plug closures. Different neck ring molds are employed at the blank stage for molding the desired Stelvin-type or cork-type neck finish configuration, but the mold for the body and neck of the bottle remains the same at the mold stage. This greatly facilitates change-over of a production line between Stelvin-type and cork-type bottles.

A method of molding a wine bottle adapted for use with one but not both of a cork-type plug closure and a Stelvin-type threaded closure, in accordance with one aspect of the present disclosure, includes forming a glass parison having a temporary body and a completed neck finish contoured for receiving either a cork-type plug closure or a Stelvin-type threaded closure. The glass parison is transferred to a mold stage, an the temporary body of the parison is blow molded at the mold stage to form a glass bottle having a neck coupled to the neck finish. With both neck finish geometries, the neck adjacent to the neck finish has external (L and K) dimensions adapted to receive a Stelvin-type threaded closure and a cylindrical interior adapted to receive a cork-type plug closure.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
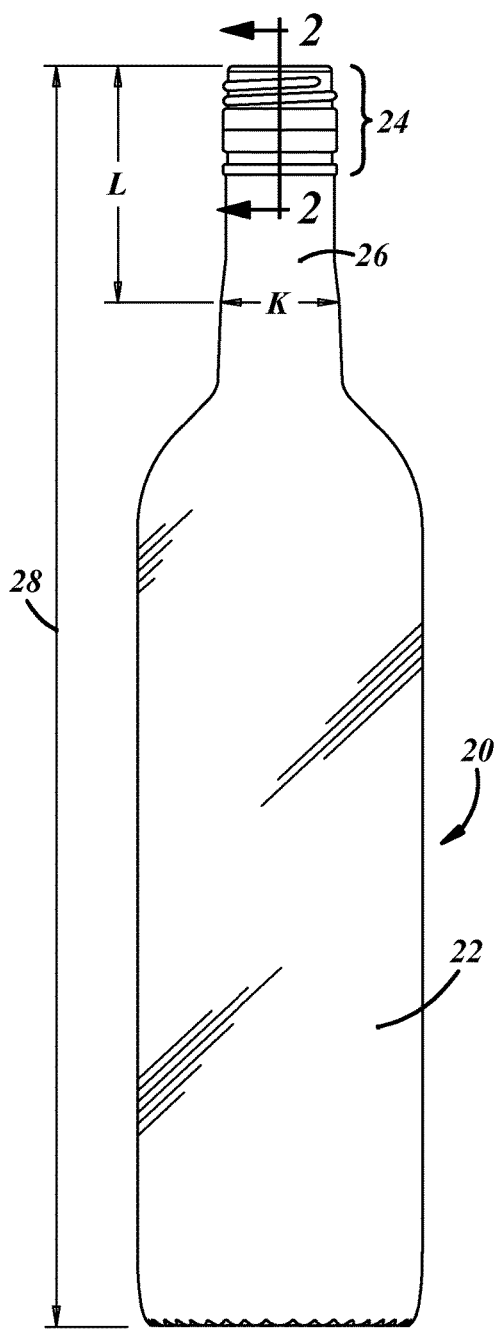
FIG. 1 is an elevational view of a glass wine bottle adapted to receive a Stelvin-type threaded closure in accordance with an exemplary embodiment of the present disclosure.
Figure 2:
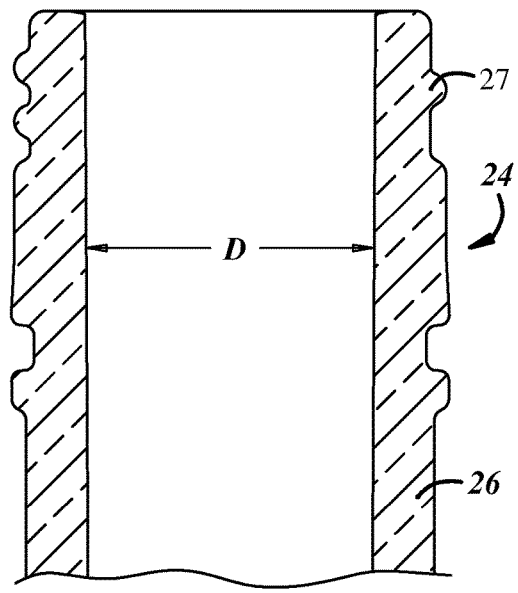
FIG. 2 is a fragmentary sectional view taken substantially along the line 2-2 in FIG. 1.

FIGS. 1 and 2 illustrates a glass wine bottle 20 having a body 22, a neck finish 24 and a neck 26 extending between the neck finish and the body. Neck finish 24 is adapted for use in conjunction with a Stelvin-type threaded closure, and includes one or more external thread segments 27. Key dimensions for the neck and neck finish include the L dimension from the top surface of the neck finish to the wide spot in the neck, and the K diameter across the wide spot in the neck. (The designations "L" and "K" are standard designations in the glass container industry.) The K dimension is across the portion of the neck where the skirt of the Stelvin-type closure is crimped. Bottle 20 also has an overall height 28 between the neck finish top surface and the base of the container. Neck finish 24 has a cylindrical internal diameter D.

Figure 3:
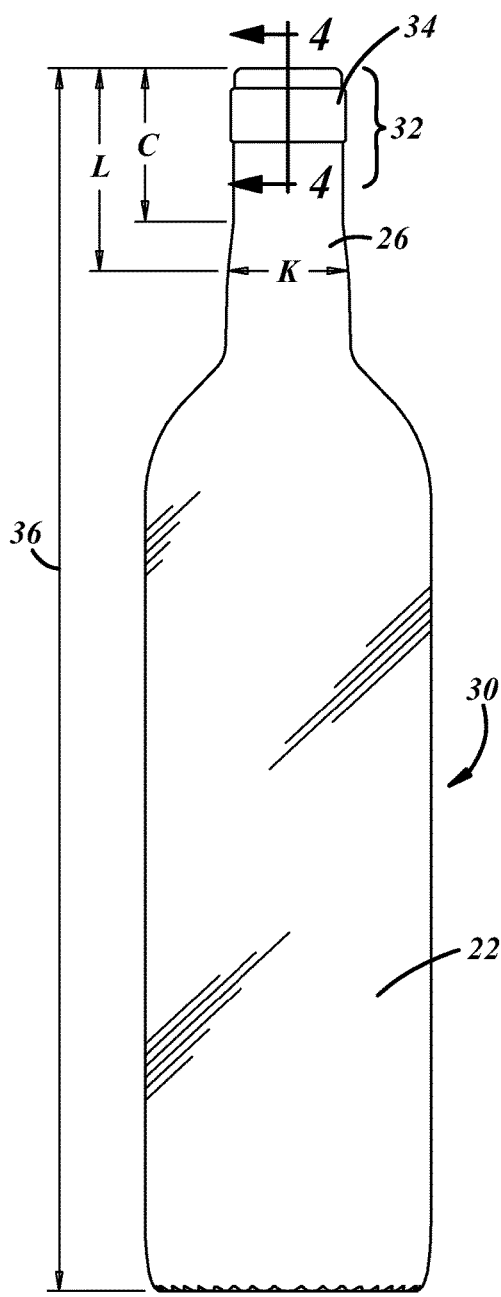
FIG. 3 is an elevational view of a glass wine bottle adapted to receive a cork-type plug closure in accordance with another exemplary embodiment of the present disclosure.
Figure 4:
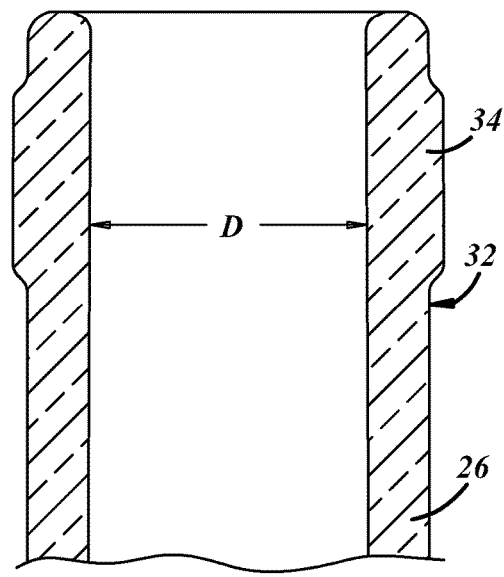
FIG. 4 is a fragmentary sectional view taken substantially along the line 4-4 in FIG. 3.

FIGS. 3-4 illustrate a cork-type glass wine bottle 30 having the same body 22 and neck 26 as bottle 20 in FIGS. 1-2. The neck finish 32 of bottle 30 includes an external shoulder 34 for gripping by a cork press, and an internal diameter D for receiving a cork-type plug closure. The diameter D extends for at least a distance C into the neck finish and neck, this distance C sometimes being referred to as the "cork spec." Bottle 30 including neck 26 and neck finish 32 have the same dimensions L, K and D as does the bottle 20 of FIGS. 1-2. The overall height 36 of bottle 30 typically would be slightly less than the height 28 of bottle 20 because of the lesser height of neck finish 32.

Thus, a glassware machine can be reconfigured from one bottle 20 or 30 to the other by simply changing the neck rings that mold the neck finish at the blank stage while leaving the blow molds at the mold stage unchanged.

There thus have been disclosed a method of making a glass wine bottle, and a resulting bottle, that fully satisfy all of the objects and aims previously set forth. The disclosure has been presented in connection with exemplary embodiments, and modifications and variations have been discussed. Other modifications and variations readily would suggest themselves to persons of ordinary skill in the art in view of the foregoing description. The disclosure is intended to embrace all of such modifications and variations as fall within the spirit and broad scope of the appended claims

The invention claimed is:

1. A method of molding a glass wine bottle for use with one but not both of a first type of closure and a second type of closure different from the first type of closure, wherein the first type of closure includes a cork-type plug closure and the second type of closure includes a threaded closure of a type having a metal shell with internal threads and a skirt crimpable to a container neck to simulate foil that covers a cork, said method including the steps of:
   (a) at a blank mold stage, forming a glass parison having a temporary body and completed neck finish including either a cork-type plug neck finish contoured for receiving the first type of closure or a threaded neck finish contoured for receiving the second type of closure,
   (b) transferring the glass parison formed in said step (a) to a blow mold stage, and then
   (c) blow molding the temporary body of the parison at said blow mold stage to form a glass bottle having a neck with said neck finish, said neck having external (L and K) dimensions for receipt of the second type of closure and a cylindrical interior including an internal diameter (D) extending over a cork spec distance (C) for receipt of the first type of closure,
   wherein different neck ring molds for forming the different neck finishes are employed at the blank mold stage depending on the type of neck finish being formed, but the same body and neck blow mold is used at the blow mold stage, to produce glass wine bottles having either but not both the cork-type plug neck finish or the threaded neck finish but otherwise having the same bottle body and neck to facilitate change-over of a production line between different types of bottles.

2. A method of making a glass wine bottle, which includes the steps of:
   (a) providing a glass manufacturing machine having
      a blank mold stage for making a parison having a neck finish including one but not both of a cork-type plug neck finish for receipt of a cork-type plug closure and a threaded neck finish for receipt of a closure of a type different from the first type of closure and having a metal shell with internal threads and a skirt crimpable to a container neck to simulate foil that covers a cork, and
      a blow mold stage for blowing said parison into a wine bottle having a body and a neck,
   (b) forming glass wine bottles using said machine provided in said step (a), wherein said glass wine bottles include the cork-type plug neck finishes or the threaded neck finishes, and also include bottle bodies and necks having external K dimensions across wide portions of the necks where skirts of the second type of closure get crimped and with external L dimensions from top surfaces of the neck finishes to the wide portions of the necks, wherein the external L and K dimensions are for receipt of the second type of closure, the necks also having cylindrical interiors including internal diameters (D) extending over cork spec distances (C) for receipt of the first type of closure,
   (c) reconfiguring said machine by leaving blow molds at said blow mold stage unchanged but changing blank mold stage neck rings to have
      said blank mold stage for making another parison having another of said cork-type plug neck finish or said threaded neck finish and
      said blow mold stage for blowing said other parison into a wine bottle having said other neck finish and the same body and neck, and
   (d) forming other glass wine bottles using said machine reconfigured in said step (c), wherein said other glass wine bottles include the other of the cork-type plug neck finishes or the threaded neck finishes, and also include the bottle bodies and necks with the L dimensions, and with the K dimensions across the necks,
   wherein different neck ring molds for forming the different neck finishes are employed at the blank mold stage depending on the type of neck finish being formed, but the same body and neck blow mold is used at the blow mold stage, to produce glass wine bottles having either but not both the cork-type plug neck finish or the threaded neck finish but otherwise having the same bottle body and neck to facilitate change-over of a production line between different types of bottles.

3. A method of molding bottles using a glassware machine, that includes the steps of:
   at a blank mold stage, using a neck ring mold to blow mold parisons having either, but not both, cork-type plug neck finishes or threaded neck finishes for receiving either, but not both, of a first type of closure or a second type of closure different from the first type of closure, wherein the first type of closure includes a cork-type plug closure and the second type of closure includes a threaded closure of a type having a metal shell with internal threads and a skirt crimpable to a container neck to simulate foil that covers a cork; and
   at a blow mold stage, using a blow mold to blow mold the parisons into bottles with necks having external L and K dimensions to receive the second type of closure and using the same blow mold to blow mold the parison into bottles with necks having a cylindrical interior with an internal diameter (D) extending over at least a cork spec distance (C) to receive the first type of closure,
   wherein different neck ring molds for forming the different neck finishes are employed at the blank mold stage depending on the type of neck finish being formed, but the same body and neck blow mold is used at the blow mold stage, to produce glass wine bottles having either but not both the cork-type plug neck finish or the threaded neck finish but otherwise having the same bottle body and neck to facilitate change-over of a production line between different types of bottles.

4. The method set forth in claim 3, including the steps of:
   at the blank mold stage, reconfiguring the glassware machine to change the neck ring mold to blow mold other parisons having other neck finishes for receiving the other of the first or second types of the closure; and
   at the blow mold stage, leaving the blow mold unchanged to blow mold the other parisons into bottles having the other neck finishes for receiving the other of the first or second types of the closure but having the same body.

5. A method, using a glassware machine, of molding first and second types of glass bottles for use with either a first type of closure or a second type of closure different from the first type of closure, wherein the first type of closure includes a cork-type plug closure and the second type of closure includes a threaded closure of a type having a metal shell with internal threads and a skirt crimpable to a container neck to simulate foil that covers a cork, comprising the steps of:
- forming, at a blank mold stage, a glass parison having a completed cork-type plug neck finish contoured for receipt of the first type of closure;
- transferring the glass parison to a blow mold stage;
- blow molding, at a blow mold stage, the glass parison into the first type of glass bottle having the completed cork-type plug neck finish contoured for receipt of the first type of closure and having a body and a neck with external dimensions (L and K) to receive the second type of closure and with a cylindrical internal diameter (D) extending over at least a cork spec distance (C) to receive the first type of closure;
- reconfiguring the glassware machine from the first type of bottle to the second type of bottle by changing neck rings at the blank mold stage, but leaving blow molds at the blow mold stage unchanged;
- forming, at the blank mold stage, another glass parison having a completed threaded neck finish contoured for receipt of the second type of closure;
- transferring the other glass parison to the blow mold stage; and
- blow molding, at the blow mold stage, the other glass parison into the second type of glass bottle having the completed threaded neck finish contoured for receipt of the second type of closure and having the same body, and the same neck with the external dimensions (L and K) to receive the second type of closure and with the cylindrical internal diameter (D) extending over at least the cork spec distance (C) to receive the first type of closure,
- wherein different neck ring molds for forming the different neck finishes are employed at the blank mold stage depending on the type of neck finish being formed, but the same body and neck blow mold is used at the blow mold stage, to produce glass wine bottles having either but not both the cork-type plug neck finish or the threaded neck finish but otherwise having the same bottle body and neck to facilitate change-over of a production line between different types of bottles.

* * * * *